Patented Oct. 3, 1939

2,174,954

UNITED STATES PATENT OFFICE 2,174,954

AZO PIGMENT AND METHOD OF PREPARING

Vincent C. Vesce, New York, N. Y., assignor to Harmon Color Works, Inc., Haledon, N. J., a corporation of New York No Drawing. Application March 22, 1937, Serial No. 132,443

8 Claims. (Cl. 260—197)

This invention or discovery relates to azo pigments and methods of preparing; and it comprises an azo pigment made by coupling another component with beta-naphthol as a fine aqueous suspension of mechanically produced particles having worked, amorphized and homogenized, uniformly reactive surfaces, the azo pigment particles having a corresponding structure and in many cases containing residual uncoupled beta-naphthol in substantial amount, the uncoupled beta-naphthol being usually more than 5 per cent of the total amount, the best amount being around 10 or 12 per cent; and it further comprises a method of making such a preparation wherein massive, dry ground or flake beta-naphthol is wet milled to give an aqueous suspension with a particle size of pigmentary magnitude, the particles having worked, amorphized, homogenized, uniformly reactive surfaces; and the suspension is then coupled, using a diazo solution in an ordinary way, washed and dried; said method being also applicable to other insoluble solid coupling components of the general chemical and physical character of beta-naphthol; all as more fully hereinafter set forth and as claimed.

Both azo dyes and azo pigments are important commercial commodities. Both are made by the general methods utilizing the well known diazo and coupling reactions, but in detail the manufacturing operations are quite different. The difficulties connected with making insoluble pigment dyes of commercial types and the need for special precautions are much greater than in making ordinary soluble dyes. The present invention provides a simplified method of making commercial azo pigments suitable for use in paint, varnish and lacquer and as toners for ordinary paint pigments. These azo pigments are mostly marketed as a fine dry powder which can be worked into paint or lacquer by ordinary paint milling operations or can be blended with other pigments. In these preparations it is desirable that the ultimate particles be of tolerably uniform size and be neither too fine nor too coarse; there is a best magnitude with each pigment. In azo pigments made by coupling insoluble solid components in finely divided form, there is a definite relation between the original particles and the new pigment particle.

The methods of making azo pigments are many and various but in all cases the operation is quite empirical, it being necessary to follow exactly a particular recipe in making each particular pigment to obtain reproducible results. There are very many variables to be taken into account: temperature, volume, time, pH, stirring conditions, etc. In making azo dyestuffs almost any diazotized amino compound ("first component") can be coupled with any phenol ("second component") but in making pigments the choice is more restricted. Beta-naphthol is widely used as the phenol. The "first component" may be almost any organic compound containing a diazotizable amino group; the choice depending upon the particular color and other properties wanted in the pigment. All differences in molecular structure in the first component make important differences in the pigment. Various groups in various positions change not only the color but many other properties, durability, light fastness, solubility, etc. For example, while various nitro-amino phenol ether groupings give excellent azo pigments, a particularly good light maroon pigment of high pigmentary value is made in coupling beta-naphthol with one particular grouping, that corresponding to 3-nitro-4-amino-1-phenol-methyl ether (meta-nitro-para-anisidine).

However, the number of amino compounds which have been used as first components is legion. Among the well known azo pigments produced by coupling beta-naphthol with another component are permanent red 2G, using 2.4-dinitraniline; pigment orange R using p-nitro-o-toluidine; and so on.

In pigment making with beta-naphthol it is mostly used in the form of a fine dispersion of reprecipitated solid particles in aqueous suspension. In so doing, a dispersed crystalline particle of reprecipitated beta-naphthol is converted into a particle of pigment and the grain size and quality of the pigment product to a large extent depend on the size and shape of the reprecipitated beta-naphthol particle. It is possible to produce pigments with the beta-naphthol in solution, that is, not as solid particles, beta-naphthol being dissolved in aqueous caustic soda, but this is considered bad practice as giving dull colors. Ordinarily, a caustic soda solution is neutralized in some way to precepitate beta-naphthol as a dispersion. The precipitated beta-naphthol is crystalline in character; the magnitude and form of the crystal particles depending on circumstances. The crystals may be tablets or needles. Sometimes precipitation is effected by adding sodium bicarbonate to the caustic soda solution; sometimes by adding an acid. Quite different results are obtained according to the method of precipitation employed; the quality of the pigment particles and their properties vary with the method of precipitation. This precipitation operation gives additional and inconvenient variables in an action which already has too many.

I have discovered that I can obviate the variables attendant on using a precipitated dispersion and also some other variables, by wet grinding solid beta-naphthol to produce an aqueous suspension of fine uniform particles of pigmentary dimensions, the particles having worked, amorphized and uniformly reactive surfaces. Not only are variables eliminated, but improved pigments are produced. No extra saline matter is added to the reaction mixture and washing necessities are lessened.

As stated, in making insoluble azo pigments from beta-naphthol, the original particle persists; the operation is, in a sense, coloring beta-naphthol particles. The milled beta-naphthol particles having worked surfaces give better pigments than the usual crystalline particles, and the operation is more susceptible to standardization. Very many variables are eliminated.

I have further discovered that in this operation considerably better results are obtained by using somewhat less of the diazo solution than theoretically corresponds to the beta-naphthol. Better colors are secured by leaving at least 5 per cent of the beta-naphthol in excess, that is, uncoupled. In many cases the very best colors are obtained with an excess of beta-naphthol of the order of 10 or 11 per cent; that is, by coupling somewhere around 90 per cent of the diazo body. Good results can be obtained with a much greater proportion of uncoupled beta-naphthol, even up to 100 per cent in excess; that is, with only about 50 per cent of the beta-naphthol coupled. But ordinarily the brighest and best colors are with about a 10 per cent excess.

Incidentally, this enables quantitative utilization of the diazo solution.

In wet grinding beta-naphthol in a ball mill, or similar device, such as colloid mill, etc., the size of particle and the character and composition of the suspension can be controlled. And this is done in the present invention. The particles of beta-naphthol in a milled suspension appear highly reactive; pigment formation requires a shorter time than is usual. This I attribute to the reactive surface of the particles; the worked and amorphized surfaces giving a uniform action at all points; there is, so to speak, in working down the beta-naphthol particles, a smearing action on the surfaces which makes them uniform and highly reactive. Something like the Beilby effect, a flow in the solid surfaces, may occur. Precipitated beta-naphthol particles are, as stated of crystalline character and they do not appear to react as uniformly as the amorphized particles used in the present invention.

In wet milling I commonly use only water. By not using either acid or alkali, another set of variables is removed. In this operation, dispersing or wetting agents can be employed as desired. In this way special effects may be obtained.

In wet grinding any of the usual ball or pebble mills may be employed. The time giving the best results depends to some extent on the mill and to some extent on the particular pigment made. As a rule, however, the best results are obtained with about two or three hours grinding of flake grade beta-naphthol in a ball mill at about 50 to 60 R. P. M. Grinding is stopped when the suspended particles are of about the size required in the azo pigment to be produced. Up to a certain point, the absorbed amount of diazo is a function of the length of milling. As stated, I regard it as good practice to leave some of the beta-naphthol uncoupled and this is taken into consideration in making the milled particles.

In producing the maroon pigment mentioned ante, using diazotized meta-nitro-para-anisidine as a first component and the described new technique, beta-naphthol is wet milled in the way described until an aqueous suspension of suitable fineness is produced. In one particular operation making a batch of the new pigment, 161 pounds of commercial flake beta-naphthol was placed in a pebble mill with 400 pounds of water. The batch was milled for 2 hours at 54 R. P. M., this giving amorphized fine particles of the right order of magnitude. The milled suspension was run into a tank and a little neutralizing base added; a base not having a solvent action on beta-naphthol. In this particular case precipitated calcium carbonate was used. Soda ash, borax, disodium phosphate, bicarbonate of soda, etc., could be used in its lieu. A clear diazo solution was prepared in the usual way from 168 pounds of 3-nitro-4-amino-1-phenyl methyl ether (meta-nitro-para-anisidine), and this was run into the beta-naphthol suspension. The mixture was kept cold, at about 10° C. Formation of a pigment dyestuff began at once. After stirring for some time, until the reaction was substantially complete, the pigment was isolated by filtering, washing and drying. In a dry state a monoazo pigment is produced as a very brilliant, soft, light maroon colored powder, insoluble in water and slightly soluble in alcohol. In concentrated sulfuric acid it dissolves to a bluish violet solution giving a dark red precipitate on addition of ice or water. Reducing agents split up the pigment dyestuff, yielding 3-nitro-4-amino-1-phenol methyl ether and besides, 1:2-amino-naphthol. The pigment is fast to light, possesses excellent covering power, has good resistance to bleeding in oil, etc. It is useful in printing inks, paints, enamels, lacquers, etc.

The pigment can be precipitated on a lake base, such as, for example, hydrated alumina or barium sulfate.

The component coupled with the beta-naphthol has the formula $C_6H_3.NO_2.NH_2.OCH_3$. It is a 1:3:4 derivative. Similar substances having other structures, such as the 1:3:5 substance may be used, but they give other colors. The 1:3:5 derivative coupled with beta-naphthol gives yellow shades.

The present method of making monoazo pigments with beta-naphthol milled into a reactive physical form is of quite general applicability; it may be used not only with regard to the particular pigment mentioned, but in making many of the common pigments using solid coupling components. The new method works particularly well with Toluidine Red Toner; the beta-naphthol coupling of meta-nitro-para-toluidine. In a typical embodiment of my process invention making Para-Nitraniline Red in a convenient size batch, 160 pounds of commercial flake beta-naphthol are placed in a pebble mill with 400 pounds of water. Milling is continued for two hours. The dispersion produced is washed from the mill into a tank and the volume brought to 1000 gallons. Into this liquid is placed a little mild alkali to neutralize adventitious acidity, whether of the beta-naphthol suspension or of the diazo solution. For the batch mentioned there may be used 110 pounds of soda ash, etc. Into the liquid thus prepared is introduced a cold diazo solution made of 138 pounds para-nitraniline, 348 pounds aqueous hydrochloric acid (31.45 per cent HCl) and 71 pounds sodium nitrite. The mixture is kept cold, say at about 10° C. until the reaction is completed when the pigment is removed, washed and dried.

The pigment was a better red than the similar pigment prepared from the precipitated beta-naphthol, all other conditions being the same. It was much brighter and evener in hue. The particle size was also better. All the variables in this operation were studied, and particularly grinding time. Results could be obtained with a shorter grinding time than two hours, while a longer grinding time, in this instance, gave no better results. With 11 per cent excess of uncoupled beta-naphthol, good color is obtained.

A bright light red can be prepared in the manner indicated using a clear diazo solution prepared from 171.5 pounds of para-chlor-ortho-nitraniline and 161 pounds of commercial beta-naphthol flakes milled with 400 pounds of water in the manner described.

The physical manipulations stated, milling a solid material into a fine-particled aqueous dispersion with particles having worked surfaces, may be used with other solid insoluble phenolic coupling components with similar good results. The point appears to be using an aqueous suspension in which the particles are not crystalline and are amorphized. For example, it works well with naphthol A. S. D. (the ortho toluidid of beta-hydroxy naphthoic acid). In making toluidine maroon of better quality than the best commercial grades, for example, 340 pounds of naphthol A. S. D. can be milled in a pebble mill for about two hours at 54 R. P. M., washed into a tank, the volume and temperature adjusted and sufficient sodium carbonate added to insure the reaction at the end of the operation being very slightly alkaline. Into this liquid is run 168 pounds of 3-nitro-4-amino-1-phenyl methyl ether (meta-nitro-para-anisidine). Another maroon can be made by substituting 152 pounds of meta-nitro-para-toluidine and coupling with 340 pounds of naphthol A. S. D., milled as previously described.

I have discovered that the softest and best colors are obtained by having an excess of beta-naphthol at the time of coupling. Also, this enables complete utilization of the diazo solution. The excess at the time of coupling may be 100 per cent; that is, twice as much beta-naphthol may be used as is coupled, or the excess may be less. It is important that not all the excess be washed out of the finished pigment. In using 100 per cent excess, I have at times obtained colors of particularly good quality in leaving about one-third of the uncoupled beta-naphthol, that is 32 per cent in the pigment.

As a general rule, however, as stated, an excess of about 11 per cent beta-naphthol at the time of coupling gives the best results. As to the condition of the unreacted beta-naphthol in the final pigment, I am uncertain; but it is my belief that part of it is nuclear to the pigment grains; this apparently being one of the reasons why the milled granules of the present invention give better results.

What I claim is:

1. In producing azo pigments from aqueous suspensions of solid insoluble phenolic coupling components by coupling with a diazo solution the process which comprises wet milling said solid component to produce a suspension of fine particles with worked and amorphized surfaces and thereafter coupling with a diazotized amine in aqueous solution.

2. The process of claim 1 wherein the coupling component is beta-naphthol.

3. The process of claim 1 wherein the coupling component is naphthol A. S. D.

4. The process of claim 1 wherein 5 per cent or more of the solid coupling component is left uncoupled.

5. The process of claim 1 wherein beta-naphthol is wet ground in a ball mill with several times its weight of water for a period of about two hours at 50 to 60 R. P. M.

6. The process of claim 1 wherein the said diazotized amine is diazotized metal-nitro-para-anisidine.

7. An azo pigment in particle form characterized by being made up of wet-milled beta-naphthol particles coupled with a diazotized amine in aqueous solution, at least 5 per cent of the beta-naphthol content of the particles being in uncoupled condition.

8. An azo pigment derived from beta-naphthol and comprising wet-milled beta-naphthol particles coupled as such with a diazotized amine in aqueous solution, the pigment particles containing at least 5 per cent of residual uncoupled beta-naphthol.

VINCENT C. VESCE.